United States Patent
Zhu et al.

(10) Patent No.: US 9,190,775 B2
(45) Date of Patent: Nov. 17, 2015

(54) ELECTRICAL CARD CONNECTOR

(71) Applicants: Fang-Yue Zhu, Kunshan (CN); Chun Ye, Kunshan (CN); Yu-Che Huang, New Taipei (TW)

(72) Inventors: Fang-Yue Zhu, Kunshan (CN); Chun Ye, Kunshan (CN); Yu-Che Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 361 days.

(21) Appl. No.: 13/727,628

(22) Filed: Dec. 27, 2012

(65) Prior Publication Data

US 2014/0187067 A1 Jul. 3, 2014

(30) Foreign Application Priority Data

Dec. 27, 2012 (CN) .......................... 2011 2 0553315

(51) Int. Cl.
*H01R 13/635* (2006.01)
*H01R 12/72* (2011.01)
*G06K 13/08* (2006.01)

(52) U.S. Cl.
CPC .......... *H01R 13/635* (2013.01); *G06K 13/0812* (2013.01); *G06K 13/0837* (2013.01); *H01R 12/721* (2013.01); *G06K 13/0825* (2013.01)

(58) Field of Classification Search
CPC ........................... H01R 13/635; G06K 13/0825
USPC .......................................... 439/159, 160, 157
See application file for complete search history.

(56) References Cited

U.S. PATENT DOCUMENTS

| | | | | |
|---|---|---|---|---|
| 7,118,397 | B1* | 10/2006 | Su et al. ........................ | 439/159 |
| 7,780,476 | B2* | 8/2010 | Sun et al. ...................... | 439/159 |
| 7,988,473 | B2* | 8/2011 | Tsai .............................. | 439/159 |

FOREIGN PATENT DOCUMENTS

TW 553529 3/2003

* cited by examiner

*Primary Examiner* — Felix O Figueroa
(74) *Attorney, Agent, or Firm* — Wei Te Chung; Ming Chieh Chang (57) ABSTRACT

An electrical card connector 100 includes an insulative housing 1 defining a card receiving space 12, a plurality of contacts 2 retained in the housing 1 and an ejector 3 assembled to the housing 1. The ejector 3 includes a slider 31, a spring 32 and a cam follower 33. The cam follower 33 includes a pivoting end 331, a sliding end 333 and a connecting portion 332 connecting with the pivoting end 331 and the sliding end 333. The housing has a first recess 112 defining a bottom wall and a second recess 113 defining a top wall and connecting with the first recess 112 along a left-to-right direction, the first recess 112 and the second recess 113 both are formed along an up-to-down direction, the pivoting end 331 is received in a pivoting hole 3114 surrounded by the first and second recesses 112, 113.

20 Claims, 7 Drawing Sheets

ELECTRICAL CARD CONNECTOR

BACKGROUND OF THE INVENTION

1. Field of the Invention

The present invention is generally related to an electrical card connector, and especially to an electrical card connector with an ejector.

2. Description of Related Art

TW Pat. No. 553529 discloses a conventional electrical card connector adapted for receiving an electrical card, which comprises an insulative housing, a plurality of contacts retained to the housing, an ejector and a metal shell covering the housing. The ejector comprises a slider defining an engaging portion which extends inwardly from an rear end of the slider, a spring abutting against the slider and a cam follower for controlling positions of the slider. The cam follower comprises a pivoting end, a sliding end and a connecting portion connecting with the pivoting end and the sliding end. The housing defines a pivoting hole extending inwardly from an outside surface thereof for pivoting the pivoting end. Recently, more and more contacts are insert-molded within the housing in order to simplify assembling processes and improve production efficiency. And the contact strip is feeded along a left-to-right direction, as a result, it is difficult to the housing to form the pivoting hole along the left-to-right direction. While for the conventional electrical card connector, the contacts can't insert-molded within the housing when the pivoting hole must be formed along the left-to-right direction.

Hence, an improved electrical card connector is highly desired to overcome the aforementioned disadvantages of the prior art.

SUMMARY OF THE INVENTION

The object of the invention is to provide an electrical card connector which has an ejector and simply manufacture.

To achieve the above object, an electrical card connector adapted for receiving a card, comprises an insulative housing defining a card receiving space, a plurality of contacts retained in the housing and an ejector assembled to the housing. The contacts comprising a contacting portion extending into the receiving space. the ejector comprises a slider, a spring disposed between the housing and the slider, and a cam follower for controlling positions of the slider. The cam follower comprises a pivoting end, a sliding end and a connecting portion connecting with the pivoting end and the sliding end. Wherein the housing has a first recess defining a bottom wall and a second recess defining a top wall and connecting with the first recess along a left-to-right direction, the first recess and the second recess both be formed along a up-to-down direction, the bottom wall of the first recess is located below the bottom wall of the second recess, the pivoting end is received in a pivoting hole surrounded by the first and second recess.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
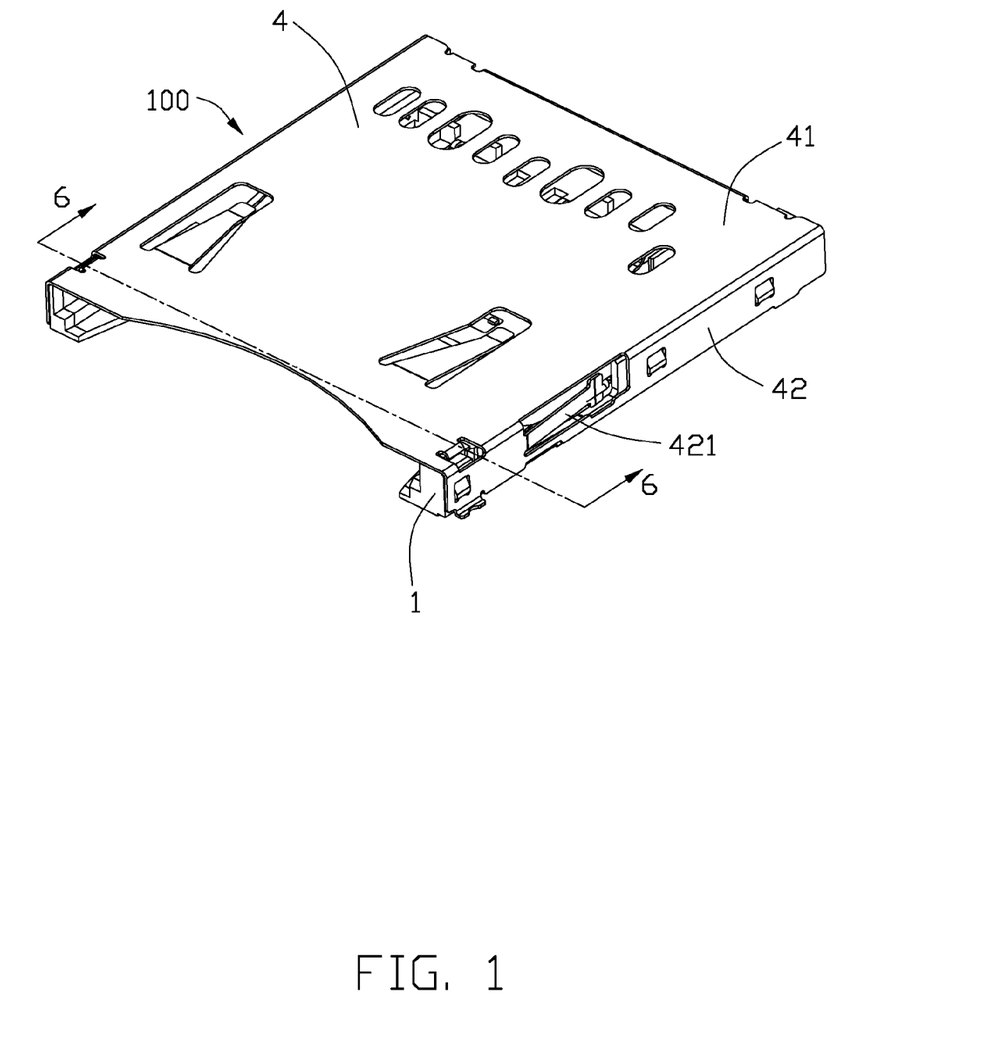
FIG. 1 is an assembled, perspective view of an electrical card connector in accordance with the present invention.
Figure 2:
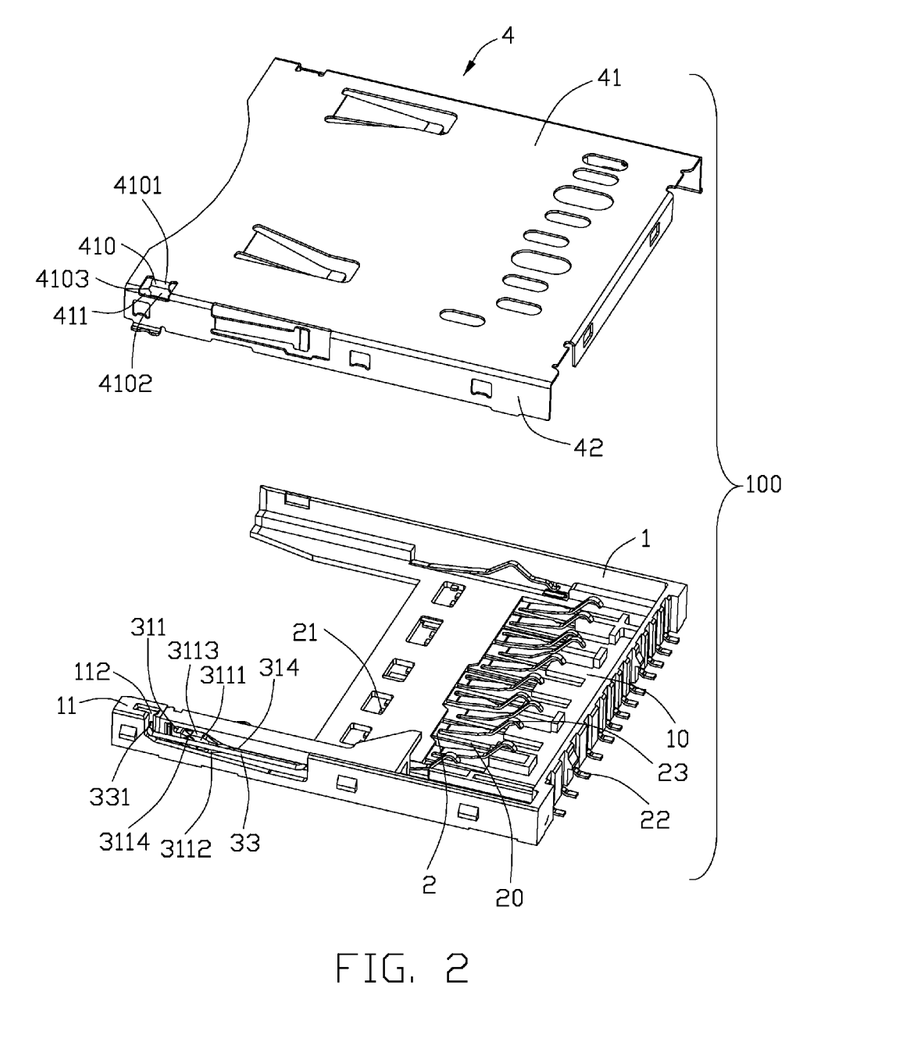
FIG. 2 is a partly assembled, perspective view of the electrical card connector in accordance with the present invention.
Figure 3:
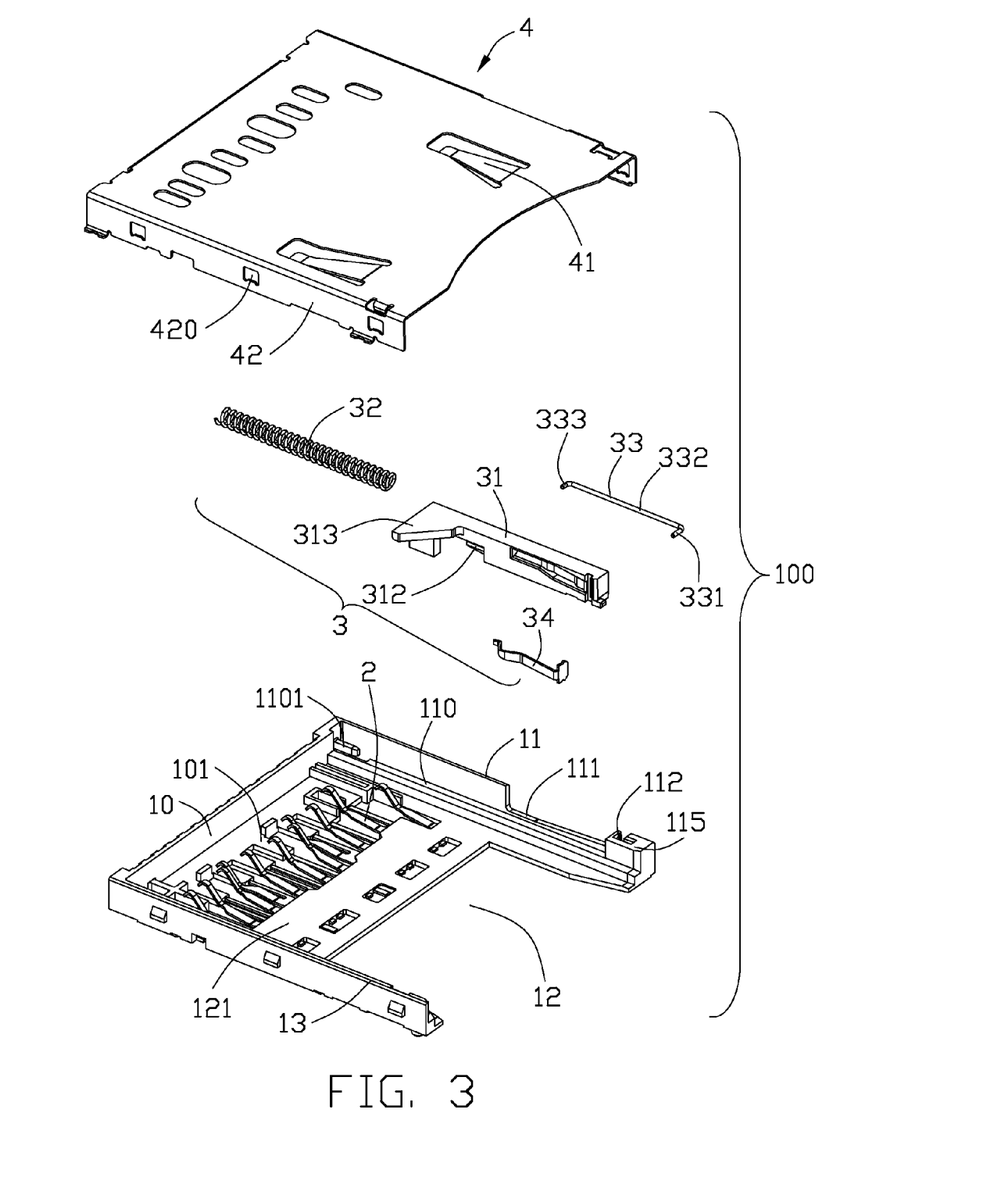
FIG. 3 is an exploded, perspective view of the electrical card connector in accordance with the present invention.
Figure 4:
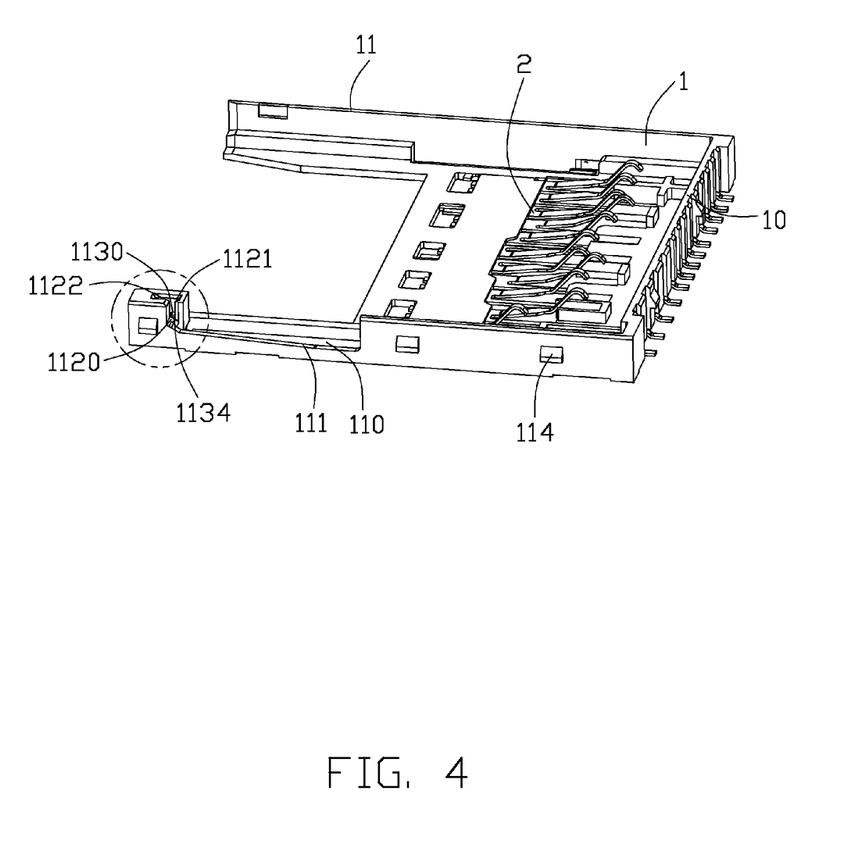
FIG. 4 is a view similar to FIG. 2, while a shell and an ejector are removed.

Referring to FIGS. 1-3, the electrical card connector 100 in accordance with the present invention is adapted for receiving a card (not shown). The electrical card connector 100 comprises an insulative housing 1, a plurality of contacts 2 received in the housing 1, an ejector 3 mounted to the housing 1 and a metal shell 4 covering the housing 1.

Referring to FIGS. 3-7, the housing 1 is approximately a rectangle configuration. The insulative housing 1 comprises a base portion 10, a pair of sidewalls extending forwardly from two opposite sides of the base portion 10 and a card receiving space 12 formed between the base portion 10 and the sidewalls for receiving the card. Conjoined with the FIG. 3, the sidewalls comprise a first sidewall 13 located on a left side of the housing 1 and a second sidewall 11 located on a right side of the housing 1. The base portion 10 defines a plurality of clapboards 101 located on an rear end thereof and a connecting wall 121 connecting with the two side walls and located in front of the clapboards 101. The second sidewall 11 defines a mounting slot 110 extending along a front-to-back direction, a through slot 111 extending outwardly through the second sidewall 11 and connecting with the mounting slot 110, a protruding post 1101 extending forwardly from an rear end thereof, and a front block 115 disposed at the front thereof with a first recess 112 recessed downwardly from a top surface thereof and a second recess 113 recessed upwardly from a bottom surface thereof.

Figure 5:
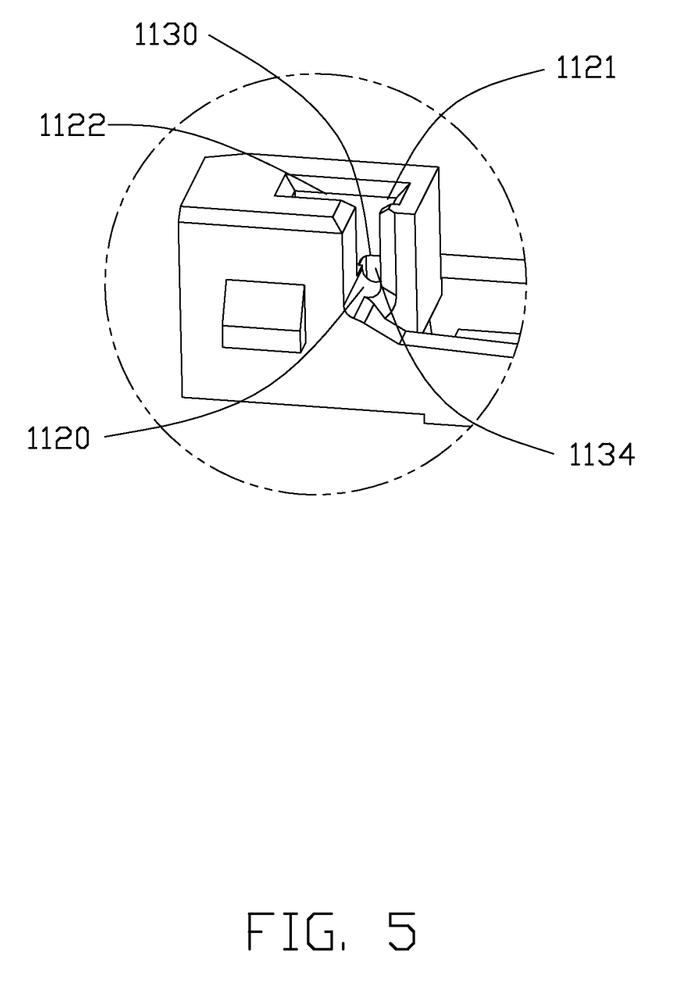
FIG. 5 is a partially enlarged view of a circle part in FIG. 4.
Figure 6:
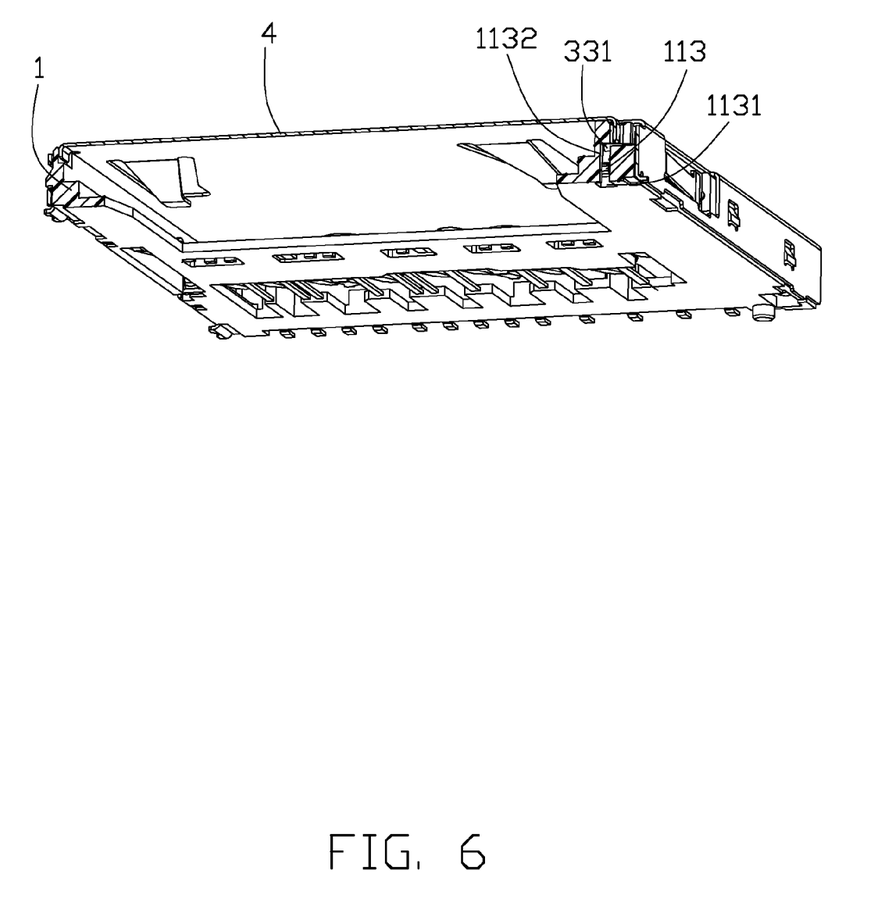
FIG. 6 is a sectional perspective view of the electrical card connector, taken along line 6-6 in the FIG. 1.
Figure 7:
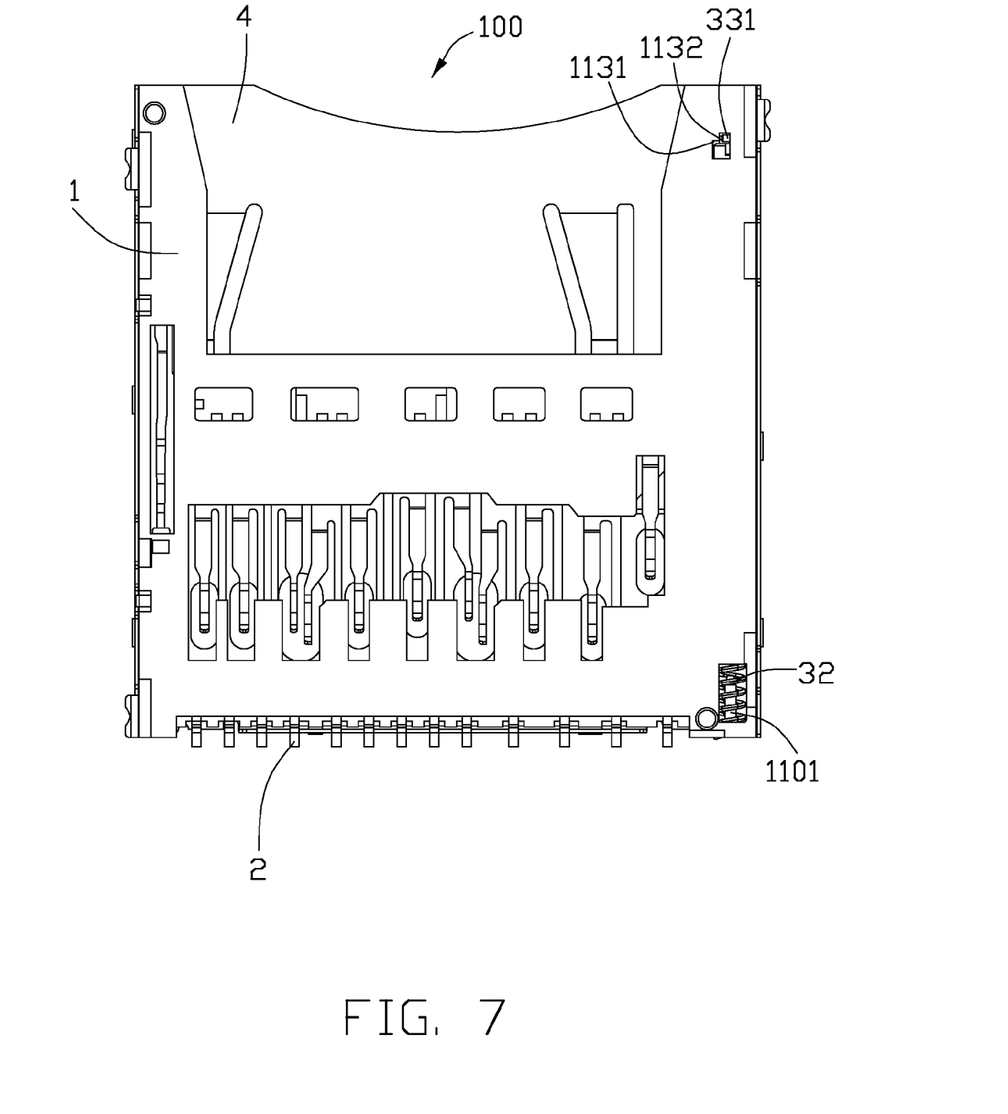
FIG. 7 is a bottom view of the electrical card connector.

The first recess 112 has a bottom wall and defines an opening upwardly. The first recess 112 has a first receiving slot 1121 extending outwardly through the second sidewall 11 and a limiting slot 1122 extending forwardly from the first receiving slot 1121. The first receiving slot 1121 defines a first cambered slot 1120 recessed downwardly on a bottom of the first receiving slot 1121 and extending along a left-to-right direction. In the left-to-right direction, the limiting slot 1122 is located on the middle of the second sidewall 11 and does not extend through the second sidewall 11. A width of the first receiving slot 1121 is bigger than that of the limiting slot 1122. The first recess 112 is a transverse L-shaped configuration as observed from a top side.

The second recess 113 has a top wall and defines an opening downwardly. The second recess 113 adjacent to the first recess 112 and is located on a left side of the first recess 112. The second recess 113 has notch 1131 and a second receiving slot 1132 extending forwardly from the notch 1131. The second receiving slot 1132 defines a second cambered slot 1130 recessed upwardly on a top of the second receiving slot 1132 and extending along the left-to-right direction and aligned with the first cambered slot 1120. In the left-to-right direction, a width of the notch 1131 is bigger than that of the second receiving slot 1132. The second recess 113 is a reversed L-shaped configuration as observed from a top side. The bottom wall of the first recess 112 is located on a left side of the top wall of the second recess 133 and located below the top wall. The first recess 112 connects with the second recess 113 along the left to right direction. The first receiving slot 1121 aligns with the second receiving slot 1132 along the left-to-right direction, the notch 1131 is located on a rear side of the first receiving slot 1121, the limiting slot 1122 is located on a front side of the second receiving slot 1132. The first cambered slot 1120 is aligned with the second cambered slot 1130 along the left-to-right direction, a bottom surface of the first cambered slot 1120 is located below a top surface of the second cambered slot 1130. The first cambered slot 1120 and the second cambered slot 1130 commonly define a pivoting hole 1134 in the circle shape when observed along the right-to-left direction. The first and second sidewalls 11, 13 are formed with a plurality of latching portions 114 for engaging with the shell 4.

Continuing to refer to FIG. 2, in this embodiment, the contacts 2 are insert-molded within the insulative housing 1 to decrease the forming process of the electrical card connector 100. Each contact 2 comprises an horizontal intermediate portion 20, a retaining portion 21 extending forwardly into the connecting wall 121 from the intermediate portion 20, a soldering leg 22 extending rearwardly into the clapboard 101 and ulteriorly extending beyond the housing 1, and a contacting portion 23 extending backwardly into the receiving space 12 from the intermediate portion 20.

Continuing to refer to FIGS. 2-3, the ejector 3 comprises a slider 31 moveably received in the housing 1 and being movable along the front-to-back direction, a spring 32 urging the slider 31 forwardly, a cam follower 33 for controlling positions of the slider 31 and a spring member 34 retained in an inner side of the slider 31. The slider 31 has a heart-shaped slot 311 located on an outside thereof, a heart-shaped bump 3111 surrounded by the heart-shaped slot 311, a communal slot 314 communicating with the heart-shaped slot 311, a retaining slot 312 is located on a rear end of the slider 31 and an engaging portion 313 extending inwardly into the receiving space 12 from the rear end of the slider 31. The heart-shaped slot 311 has a forward guiding slot 3112 and a backward guiding slot 3113 extending upwardly and downwardly from one end of the communal slot 314 respectively and a locking slot 3114 connecting with the forward guiding slot 3112 and the backward guiding slot 3113. The spring 32 has two ends, one end surrounding the post 1101 and the other end retained in the retaining slot 312 to provide a needed elastic force when the card is ejected from the electrical card connector 100. The cam follower 33 has a pivoting end 331, a sliding end 333 and a connecting portion 332 connecting with the pivoting end 331 and the sliding end 333.

Referring to FIGS. 2-3, the metal shell 4 is stamped from a metal sheet and covers the housing 1. The metal shell 4 comprises a top plate 41 and a pair of lateral plates 42 extending downwardly from the top plate 41. The top plate 41 has two elastic portions 412 extending downwardly into the receiving slot 12, a flange 410 extending downwardly into the first recess 112, and an opening 411 surrounding the flange 410. Each lateral plate 42 has a plurality of mating holes 420 engaging with the latching portion 114 of the housing 1 and an abutting portion 421 extending inwardly into the through slot 111 to abut against the cam follower 33. The flange 410 comprises a bend portion 4101 connecting with the top plate 41, and a limiting portion 4102 extending downwardly from the bend portion 4101 and defining a plurality of barbs 4103 located on two opposite sides thereof. The limiting portion 4102 is a vertical flakiness, and parallels with the lateral plate 42 and defines a gap with the corresponding lateral plate 42 therebetween. The limiting portion 4102 inserts downwardly into the first recess 112 and abuts against the pivoting end 331. A front portion of the limiting portion 4102 is received in the limiting slot 1122, a rear portion of the limiting portion 4102 is received in the first receiving slot 1121 and locates above the pivoting end 331 for preventing the pivoting end 331 from moving upwardly and leaving the first recess 112. The limiting slot 1122 prevents the flange 410 from shaking along the left-to-right direction. The barbs 4103 interfere with two opposite inner walls of the recess 12 for prevent the limiting portion 4102 from moving upwardly.

Referring to FIGS. 1-7, in assembly, the slider 31 of the ejector 3 is received in the mounting slot 110 of the housing 1, one end of the spring 32 surround the post 1101 of the second sidewall 11, the other end of the spring 32 is retained in the retaining slot 312 of the slider 31. And then, the sliding end 333 of the cam follower 33 is assembled inwardly to the communal slot 314, the cam follower 33 is assembled inwardly to the first receiving slot 1121. At last, the shell 4 covers the housing 1. The mating hole 420 of the lateral plate 42 locks with the latching portion 114 of housing 1. The abutting portion 421 crosses the through slot 111 to abut against the cam follower 33 for preventing the cam follower 33 from moving outwardly. The limiting portion 4102 of the flange 410 downwardly enters into the recess 112 and abuts against the pivoting end 331 along the up-to-down direction. The limiting slot 1122 prevents the limiting portion 4102 from shaking along the left-to-right direction. The pivoting end 331 crosses the first recess 112 and then enters into the second recess 113 and is positioned right below the top wall of the second recess 113. The pivoting end 331 is received in the pivoting hole 1134 surrounding by the first cambered slot 1120 and the second cambered slot 1130 and rotates in the pivoting hole 1134 to ensure it is smoothly when the card inserts into the electrical card connector 100 or is withdrawn from the electrical card connector 100.

When the card is inserted into the electrical card connector 100, an rear end of the card abuts against the engaging portion 313 of the slider 31 to bring the slider 31 to move with the card. At the same time, the sliding end 333 of the cam follower 33 moves to the forward guiding slot 3112 from the communal slot 314, and then moves into the locking slot 3114. When the card arrives its final position, a force between the cam follower 33 and the slider 31 is in balance with that between the slider 31 and the spring 32. When the card is withdrawn from the electrical card connector 100, the user pushes the card rearwardly to make the sliding end 333 moves rearward to the backward guiding slot 3113 from the locking slot 3114, by this way, the spring 32 presses the slider 31 forwardly and makes the slider 31 move forwardly until the sliding end 333 returns to the original position.

In the embodiment, the electrical card connector 100 adopts the pivoting hole 1134 surrounded by the first and second recess 112, 113 that formed along the up-to-down direction to substitute the pivoting hole 1134 formed along the left-to-right direction to receive the pivoting end 331, so the contacts 2 can insert-molded within the housing 1 to decrease the forming process of the electrical card connector 100.

In another embodiment, the limiting portion 4102 of the shell 4 can be substituted by a separate piece of metal or an insulative block. The separate piece of metal or the insulative block mates with the recess 112 also can achieve the purpose that above preferred embodiment want to achieved.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulative housing defining a receiving space for receiving a card;
   a plurality of contacts retained in the housing and having a contacting portion extending into the receiving space; and
   an ejector assembled to the housing, the ejector having a slider, a spring located between the insulative housing and the slider, and a cam follower for controlling positions of the slider, the cam follower having a pivoting end, a sliding end and a connecting portion connecting with the pivoting end and the sliding end; wherein
   the housing has a first recess with a bottom wall and a second recess formed with a top wall and connecting with the first recess along a left-to-right direction, the first recess and the second recess are both recessed along an up-to-down direction, the bottom wall of the first recess is located below the top wall of the second recess, the pivoting end is received in a pivoting hole surrounded by the bottom wall of the first recess and the top wall of the second recess; wherein
   said bottom wall and said top wall are offset from each other along said left-to-right direction.

2. The electrical card connector as claimed in claim 1, wherein the first recess extends outwardly through the housing.

3. The electrical card connector as claimed in claim 1, wherein the bottom wall of the first recess and the top wall of the second recess are staggered in the left-to-right direction and an up-to-down direction, the pivoting end crosses the first recess and then enters into the second recess and is positioned right below the top wall of the second recess.

4. The electrical card connector as claimed in claim 1, wherein the first recess has a first receiving slot and a limiting slot extending forwardly from the first receiving slot, the first receiving slot defines a first cambered slot recessed downwardly on a bottom of the first receiving slot and extending along the left-to-right direction.

5. The electrical card connector as claimed in claim 4, wherein the second recess has a notch and a second receiving slot extending forwardly from the notch, the second receiving slot defines a second cambered slot recessed upwardly on a top thereof, the second cambered slot extends along the left-to-right direction and connects with the first cambered slot.

6. The electrical card connector as claimed in claim 5, wherein the second recess is adjacent to the first recess and is located on a left side of the first recess, the first receiving slot extends outwardly through the housing, the first cambered slot aligns with the second cambered slot along the left-to-right direction, a bottom of the first cambered slot is located below a top of the second cambered slot, the pivoting hole is a circle when observed along an right-to-left direction.

7. The electrical card connector as claimed in claim 5, wherein a width of the limiting slot is smaller than that of the first receiving slot, the first recess is a transverse L-shaped configuration when observed from a top side, a width of the notch is bigger than that of the second receiving slot, the second recess is a reversed L-shaped configuration when observed from the top side.

8. The electrical card connector as claimed in claim 5, wherein the first receiving slot aligns with the second receiving slot along the left-to-right direction, the notch is located on a rear side of the first receiving slot, the limiting slot is located on a front side of the second receiving slot.

9. The electrical card connector as claimed in claim 8, further comprising a shell covering the housing, the shell has a top plate and a pair of lateral plates extending downwardly from the top plate, the top plate has a flange extending downwardly into the first recess and an opening surrounding the flange, the flange parallels with both pair of the lateral plates and defines a gap with a closer corresponding lateral plate therebetween.

10. The electrical card connector as claimed in claim 8, wherein a front portion of the flange is received in the limiting slot, a rear portion of the flange is received in the first receiving slot and downwardly abuts against the pivoting end, the limiting slot prevents the flange from shaking along the left-to-right direction.

11. An electrical card connector comprising:
    an insulative housing defining a receiving space for receiving a card;
    a plurality of contacts retained in the housing and having a contacting portion extending into the receiving space; and
    an ejector assembled to the housing, the ejector having a slider, a spring located between the insulative housing and the slider, and a cam follower for controlling positions of the slider, the cam follower having a pivoting end, a sliding end and a connecting portion connecting the pivoting end and the sliding end; wherein
    the housing defines a first recess and a second recess both formed along a top-to-bottom direction and communicating with each other along a left-to-right direction, the pivoting end is inserted in to the first and the second recess and is limited by a bottom of the first recess and a top of the second recess; wherein
    said bottom and said top are offset from each other in the left-to-right direction.

12. The electrical card connector as claimed in claim 11 wherein the first recess has a bottom wall, the second recess has a top wall, the bottom wall of the first recess is located below the top wall of the second recess, a pivoting hole is surrounded by the first and second recess to receive the pivoting end.

13. The electrical card connector as claimed in claim 12, wherein the first recess extends outwardly through the housing, the bottom wall of the first recess and the top wall of the second recess are staggered in the left-to-right direction and the top-to-bottom direction, the pivoting end crosses the first recess and then enters into the second recess and is positioned right below the top wall of the second recess.

14. The electrical card connector as claimed in claim 12, wherein the first recess has a first receiving slot defining a first cambered slot recessed downwardly from a bottom thereof and a limiting slot extending forwardly from the first receiving slot, the second recess has a notch and a second receiving slot extending forwardly from the notch, the second receiving slot defines a second cambered slot recessed upwardly from a top thereof and connecting the first cambered slot.

15. The electrical card connector as claimed in claim 14, wherein the second recess is adjacent to the first recess and is located on a left side of the first recess, the first receiving slot extends outwardly through the housing, the first cambered slot aligns with the second cambered slot along the left-to-right direction, the bottom of the first cambered slot is located below the top of the second cambered slot, the pivoting hole is a circle when observed along an right-to-left direction.

16. An electrical card connector assembly for use with an electronic card, comprising:
    an insulative housing defining a bottom wall and a pair of side walls extending upwardly on two opposite lateral sides of the bottom wall;

a metallic shell positioned upon the housing and cooperating with the housing to define a card receiving space therebetween in a vertical direction;

a plurality of contacts disposed in the bottom wall with contacting sections extending into the card receiving space;

an ejector, for loading/unloading the electronic card, assembled to one of said side walls of the housing, said ejector defining a slider back and forth moveable relative to the housing in a front-to-back direction perpendicular to said vertical direction with a heart-shaped slot therein, and a cam follower defining a first end section extending in a transverse direction, which is perpendicular to both said vertical direction and said front-to-back direction, and moveable along the heart-shaped slot, and said cam follower further defining a second end section, opposite to the first end section in the front-to-back direction, extending in the transverse direction and pivotally mounted into a pivot hole of said one of the side walls, said hole defining an axis extending in said transverse direction;

said housing further defining an upward facing recess, said recess defining a receiving slot to communicate with an exterior in the transverse direction and a limiting slot intersecting said receiving slot and extending in the front-to-back direction with a distance; and said shell defining a downwardly extending limiting tab inserted into the limiting slot; wherein said receiving slot defines a lower portion of said pivot hole under condition of a lower portion of the second end section downwardly facing and upwardly supportably seated upon an abutment face of the receiving slot while an upper portion of the second end section upwardly abutting against the limiting tab.

17. The electrical card connector as claimed in claim 16, wherein the receiving slot does not reach either end of said limiting slot in the front-to-back direction.

18. The electrical card connector as claimed in claim 17, wherein said shell defines a top plate with a pair of side plates downwardly extending from two opposite lateral side edges of the top plate under condition that the limiting tab is split from the top plate and inside of the corresponding side plate.

19. The electrical card connector as claimed in claim 18, wherein said corresponding side plate covers the receiving slot in the transverse direction but exposing said receiving slot in the vertical direction.

20. The electrical card connector as claimed in claim 16, wherein said housing further defines another receiving slot opposite to and offset from said receiving slot in both the transverse direction and the vertical direction, to define an upper portion of the pivot hole, the upper portion of the second end section upwardly facing and downwardly supported by another abutment face of said another receiving slot.

* * * * *